United States Patent [19]

Iwasaki

[11] 4,356,438
[45] Oct. 26, 1982

[54] MOTOR SPEED CONTROL SYSTEM

[75] Inventor: Shinichiro Iwasaki, Auburn Heights, Mich.

[73] Assignee: Aisin Seiki Company Limited, Kariya, Japan

[21] Appl. No.: 182,676

[22] Filed: Aug. 29, 1980

[51] Int. Cl.³ .............................................. H02P 5/18
[52] U.S. Cl. .................................... 318/344; 318/334; 318/350; 307/420
[58] Field of Search ............... 318/334, 341, 344, 350, 318/355, 532, 536; 307/106, 107, 415, 419, 420

[56] References Cited

U.S. PATENT DOCUMENTS

| | | | |
|---|---|---|---|
| 3,119,022 | 1/1964 | Bruntil et al. | 307/419 |
| 3,214,601 | 10/1965 | Christopherson | 307/419 |
| 3,315,087 | 4/1967 | Ingenito | 307/419 |
| 3,903,465 | 9/1975 | Ibamoto et al. | 318/341 |
| 3,914,672 | 10/1975 | Kiwaki et al. | 318/341 X |
| 3,942,085 | 3/1976 | Tadakuma et al. | 318/341 |
| 4,150,324 | 4/1979 | Naito | 318/341 X |
| 4,204,143 | 5/1980 | Coleman | 318/341 |
| 4,257,092 | 3/1981 | Prines et al. | 318/341 X |
| 4,267,967 | 5/1981 | Beck et al. | 318/334 X |

FOREIGN PATENT DOCUMENTS

| | | | |
|---|---|---|---|
| 54-5521 | 1/1979 | Japan | 318/334 |
| 457155 | 3/1975 | U.S.S.R. | 318/334 |

*Primary Examiner*—J. V. Truhe
*Assistant Examiner*—Richard M. Moose
*Attorney, Agent, or Firm*—Oblon, Fisher, Spivak, McClelland & Maier

[57] ABSTRACT

A motor speed control system utilizing a pulse duty controlling element including a core of an amorphous, magnetically soft material having a first and a second coil disposed thereon. A first set of pulses are applied to one end of the first coil while a constant voltage or a second set of pulses are applied to one end of the second coil. A duty controlled pulse is outputted from the other end of the first coil for supply to an electric motor. The other end of the second coil is connected to a current level controlling transistor, the base of which is connected to speed presetting means. The output pulse appearing at the other end of the first coil has a rising edge which lags behind the rising edge of a pulse in the first set of pulses by a time delay which depends on the degree of conduction of the transistor which is in turn determined by a preset value of the speed presetting means, and has a falling edge which is substantially synchronized with the falling edge of the pulse in the first set.

8 Claims, 9 Drawing Figures

MOTOR SPEED CONTROL SYSTEM

BACKGROUND OF THE INVENTION

1. Field of the Invention

The present invention relates in general to a novel motor speed control system which controls the speed of an electric motor by the pulse duty control of a current or a voltage pulse supplied to the motor.

2. Description of the Prior Art

A prior art control system of this type usually includes an electronic pulse duty control circuit which develops pulses having a duty ratio which depends on a preset speed signal, and a power amplifier. The control circuit is frequently formed as an integrated circuit incorporating a triangular wave generator and a comparator. This prior art arrangement requires an increased number of circuit elements, and is susceptible to noises. Additionally, careful attention to environment factors such as temperature, is required thereby limiting the locations in which the circuit may be used. Consequently, when the conventional arrangement is used to control motors disposed on a vehicle, for example, it must be disposed at a location remote from the motor or motors being controlled which is free from the influence of oscillations in order to prevent damage or malfunctioning due to oscillations, noises, or elevated temperatures.

SUMMARY OF THE INVENTION

It is a first object of the present invention to provide a novel motor speed control system requiring a reduced number of electronic circuit elements.

A second object of the present invention is to provide a novel motor speed control system capable of controlling a relatively high level of power with a reduced number of electronic elements.

A third object of the present invention is to provide a novel motor speed control system having a high resistance to oscillations and noises which can be located relatively close to an equipment being controlled.

These and other objectives are achieved in accordance with the present invention by utilizing a pulse duty controlling element which includes a core made of an amorphous, magnetically soft material having a first electrical coil wound thereon which converts an input pulse into a duty controlled pulse, and a second duty controlling electrical coil wound thereon. A reference pulse (or a first set of pulses) is applied to one end of the first electrical coil; the other end of which is connected to an electric motor. A constant voltage or a second set of pulses are applied to one end of the second electrical coil; the other end of which is connected to a current controlling element such as a transistor having a control input which is connected to a motor a speed presetting circuit. The arrangement is such that the impedance or the degree of conduction of the current controlling element is controlled in accordance with a speed preset voltage which is produced by the motor speed presetting circuit.

The amorphous, magnetically soft material is shaped into thin sheets since it must be quenched from a liquid metal. Magnetically, it exhibits a high ferromagnetism, a high permeability ($u_{max} > 10^3$), a low level of magnetic saturation, and a low coercive force ($< 1.0$ Oe); while mechanically it exhibits a very high fracture strength and an excellent resilience and stability. Such magnetically soft materials are described in Hasegawa et al, "Soft Magnetic Properties of Metallic Glasses-Recent Developments", J. Appl. Phys. 50(3), March, 1979, pp. 1551–1556. Magnetically soft materials are sold under the trademark METGLAS (TM) by Allied Chemical Corp.

The use of such amorphous magnetically soft material for the core of the duty controlling element facilitates the manufacture of the duty controlling element, which therefore has a high resistance to oscillations and impacts. Of particular importance is the fact that the duty controlling element is capable of affording any desired level of power control through a suitable choice of its size, enabling the output from the duty controlling element to be directly used to energize the field or the armature of the motor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
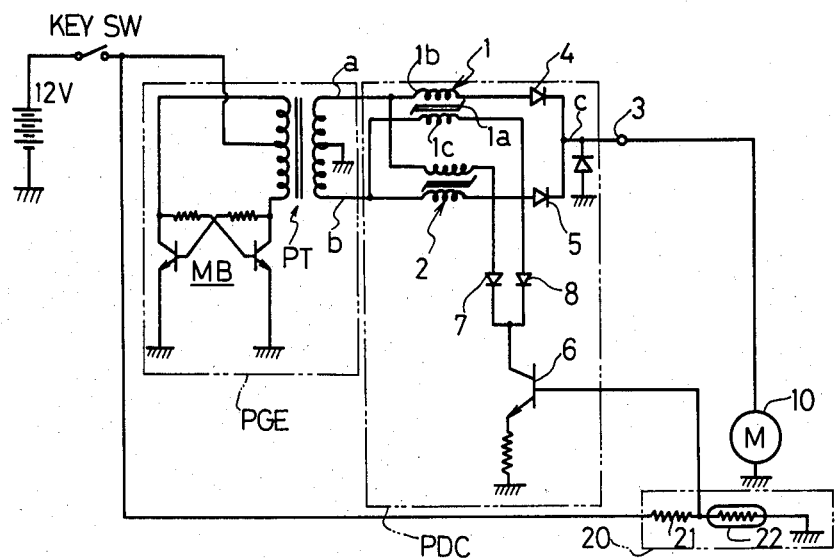
FIG. 1 is a circuit diagram of a first embodiment of the present invention.
Figure 2A:
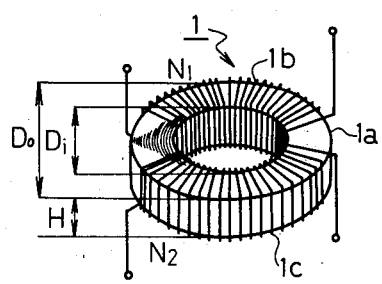
FIG. 2a is a perspective view illustrating the pulse duty controlling element shown in FIG. 1.

Referring now to the drawings, wherein like reference numerals designate identical or corresponding parts throughout the several views, and more particularly to FIG. 1 thereof, a first embodiment of the present invention is illustrated as including a pulse generator PGE, formed by a multivibrator MB which oscillates at a frequency of 5 kHz, and a pulse transformer PT. Two sets of bipolar pulses a and b (having inverted polarities on the positive and the negative side of zero or ground level) (see FIG. 3) are developed at the output terminals of the pulse generator PGE or at the opposite ends of the secondary winding of the pulse transformer PT. These pulses a and b are applied to a pulse duty control system PDC. The pulse duty control system PDC includes a pair of duty controlling elements 1 and 2, diodes 4, 5, 7 and 8, and an NPN transistor 6 which controls the current level. One of the pulse duty controlling elements 1 is shown in an enlarged perspective view of FIG. 2a. It includes a ring core 1a, which is formed by a spiral winding of a thin sheet of amorphous magnetically soft material, and first and second electrical coils 1b, 1c, which are disposed on the ring core 1a. The electrical connection of the duty controlling element 1 alone is shown in detail in FIG. 2b.

Figure 2B:
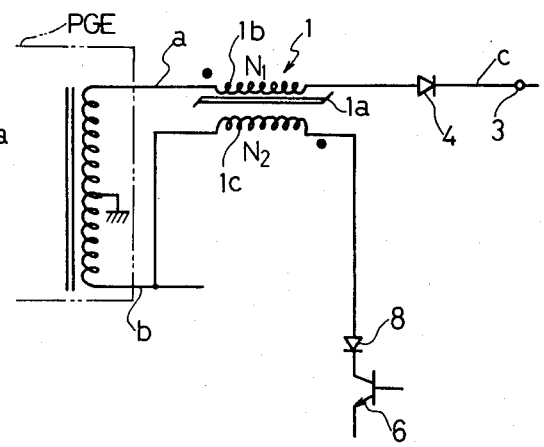
FIG. 2b is a circuit diagram of the pulse duty control system shown in FIG. 1.
Figure 3:
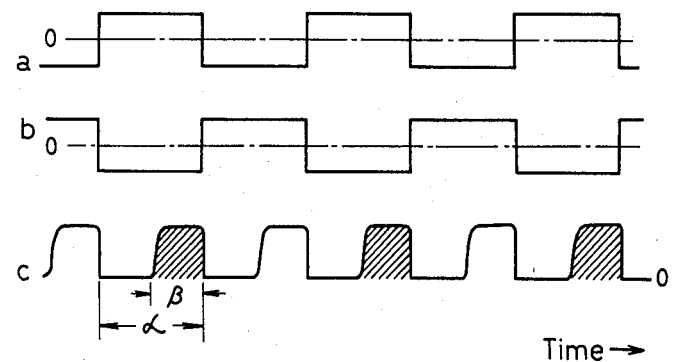
FIG. 3 is a series of timing charts illustrating the waveforms a to c of signals appearing at various locations in the circuit of FIG. 1.

Referring to FIG. 2b, the first electrical coil 1b of the element 1 has one end connected to the output terminal of the pulse generator PGE where the first set of pulses a are developed, and has its other end connected through the diode 4 to the output terminal 3 where a duty controlled pulse is developed. The second electrical coil has one end connected to the output terminal of the pulse generator PGE where the second set of pulses b are developed and has its other end connected through the diode 8 to the collector of the transistor 6. As a result of this circuit, when a positive voltage portion of the pulse a is applied to one end of the first coil 1b, the negative voltage portion of the pulse b is applied to one end of the second coil 1c. However, since the diode 8 is back biased, no current flows through the second electrical coil 1c. Whenever the negative voltage portion of the pulse a is applied to one end of the first coil, the diode 4 is non-conductive to prevent a current flow through the first coil 1b. However, a current flow occurs through the second coil 1c when the positive voltage portion of the pulse b is applied to one end of the second coil 1c and the transistor 6 is rendered conductive. To summarize, a current flow occurs through the first and the second electrical coils in alternate fashion in synchronism with the pulses a and b. Since the first and the second electrical coils are excited in opposite directions as shown in FIG. 2b, a magnetic flux (or magnetization) which is developed by the energization of the first coil is reduced or reset by the energization of the second coil. Depending on the degree of conduction of the transistor 6, the current level through the second coil 1c or the reduction of the flux varies. A time interval from the rising edge of the input pulse a to the rising edge of the output pulse c or the time delay $\alpha$-$\beta$ (see FIG. 3) of the rising edge of the pulse c relative to that of the pulse a, depends on the reduction of the flux. The time delay $\alpha$-$\beta$ increases for a high degree of conduction of the transistor 6, and decreases for a lower degree of conduction. In this manner, the pulse duty ratio $\beta/\alpha$ depends on the degree of conduction of the transistor 6. The output pulses from the pulse duty controlling element 1 are those pulses c shown in FIG. 3 which are hatched.

In the embodiment shown in FIG. 1, a second pulse duty controller is formed by the second pulse duty controlling element 2, diodes 5 and 7, and the common transistor 6. In this controller, the pulse b is applied to the first coil of the element 2 while the pulse a is applied to the second coil. As a result, the pulses c shown in FIG. 3 which are not hatched appear at the cathode of the diode 5. In this manner, the first and the second pulse duty controlling elements 1 and 2 produce pulses having the same period as the input pulse a, which have their duty cycle controlled, and which are phase displaced by 180° from each other for application to the output terminal 3. Thus, the pulses c shown in FIG. 3, having twice the frequency of the input pulse a (5 kHz), are obtained at the output terminal 3, with the duty ratio $\beta/\alpha$ of the pulse depending on the degree of conduction of the transistor 6.

Again referring to FIG. 1, the output pulse c from terminal 3 of the pulse duty control system PDC is applied to the field winding of a D.C. motor 10. A speed voltage from a speed presetting circuit 20 is applied to the base of the transistor 6 as a control signal. The circuit 20 includes a resistor 21 and a thermistor 22 having a negative temperature characteristic. Accordingly, when the temperature of the thermistor 22 is high, the base voltage or the speed voltage of the transistor 6 is low, and hence the degree of conduction of the transistor 6 is low. Hence the reduction of the flux by the duty controlling elements 1, 2 is reduced, so that the pulse duty control system PDC supplies pulses c having a high value of the ratio $\beta/\alpha$ to the field winding of the motor 10. When the temperature of the thermistor 22 is low, the speed voltage increases, so that the system PDC supplies pulses c having a smaller value of the ratio $\beta/\alpha$ to the field winding of the motor 10. As a consequence, the motor 10 operates at a higher speed and a lower speed for a higher and a lower temperature of the thermistor 22, respectively.

Figure 4:
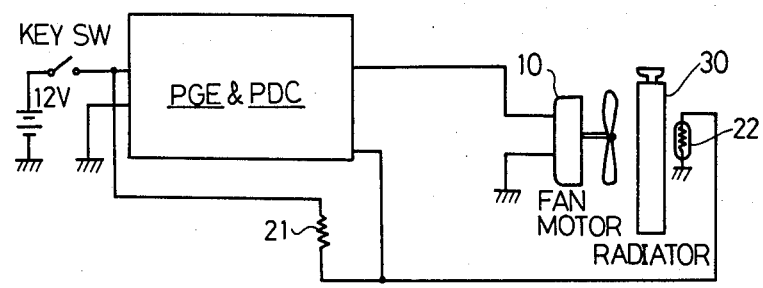
FIG. 4 is a block diagram of a radiator cooling system mounted on a vehicle which incorporates the motor speed control system shown in FIG. 1.

The motor control system shown in FIG. 1 is connected to the field winding of a cooling fan motor 10 associated with a radiator on a vehicle in the manner illustrated in FIG. 4. The thermistor 22 in the speed presetting circuit 20 is immersed in the water of a radiator 30 for detecting the temperature thereof.

Figure 5:
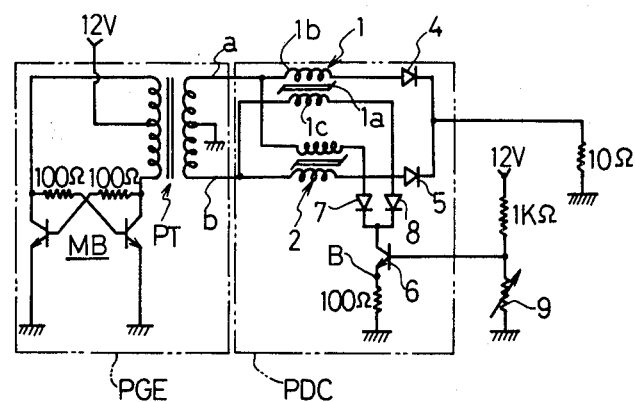
FIG. 5 is a circuit diagram of a circuit arrangement in which the motor in the motor speed control system of FIG. 1 is replaced by a 10 ohm resistor in order to determine the pulse duty control characteristic of the system.

By using an experimental circuit shown in FIG. 5 in which the motor 10 of FIG. 1 is replaced by a resistor having a resistance of 10 ohms and the thermistor 22 is replaced by a variable resistor 9, the inventor of the present invention has determined the duty ratio $\beta/\alpha$ of the pulse c applied to the 10 ohm resistor for a varying resistance of the variable resistor 9. The material and dimensions of the duty controlling elements 1, 2 used is indicated in the Table 1 below, with the data obtained shown in FIG. 6.

TABLE 1

| material & dimensions of core 1a of duty controlling elements 1, 2 | | | |
|---|---|---|---|
| material | configuration | coil 1b | coil 1c |
| (Atomic weight %) Fe$_{40}$Ni$_{38}$Mo$_4$B$_{18}$ amorphous alloy sheet, thickness = 0.050 mm | laminated ring core of 110 sheets (FIG. 2a) Di(mm) Do(mm) H(mm) 6  12  2 | 50 turns | 40 turns |

Figure 6:
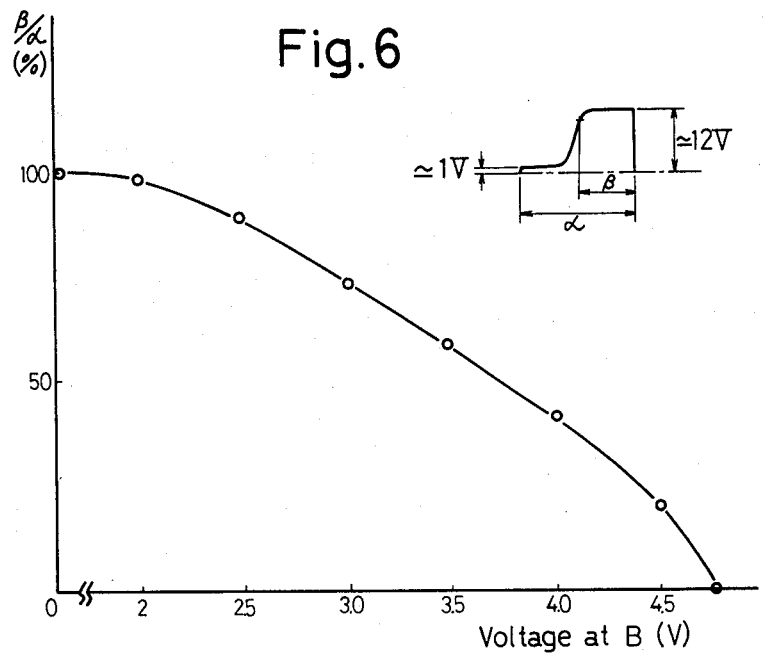
FIG. 6 graphically illustrates experimental data obtained with the arrangement of FIG. 5.

As will be noted in FIG. 6, the experimental circuit shown in FIG. 5 permits a control of the ratio $\beta/\alpha$ between zero and 100 percent. Accordingly, the speed of the motor 10 can be controlled over an extensive range.

Figure 7:
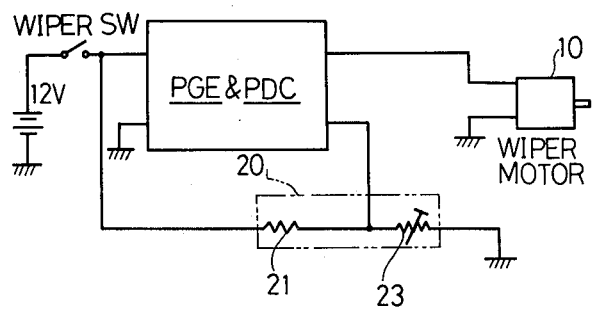
FIG. 7 is a block diagram of another embodiment of the present invention illustrating a motor speed control system associated with a windshield wiper on a vehicle.

FIG. 7 shows another embodiment of the present invention in which the speed of a windshield wiper motor 10 is controlled by a value which is preset by a manually adjusting variable resistor 23. When a wiper switch is closed, the wiper motor 10 rotates in a manner corresponding to the value preset by the variable resistor 23, rotating at a low speed for an increased resistance and at a higher speed for a lower resistance. A driver of the vehicle can continuously change the wiper speed by adjusting the resistor 23.

It should be understood that the motor speed control system of the present invention is similarly applicable to the speed control of other motors, such as, for example, a fan motor associated with an air conditioner. The motor speed control system of the present invention can also be used to control an armature current of the motor to effect a speed control. When either the field or the armature current is controlled, the current capacity of the pulse generator PGE and the pulse duty control system is chosen in accordance with the current range. The loading capacity of the duty controlling elements 1, 2 can be relatively freely established by choosing the core size, the diameter of the wire used for the winding, and the number of turns.

Figure 8:
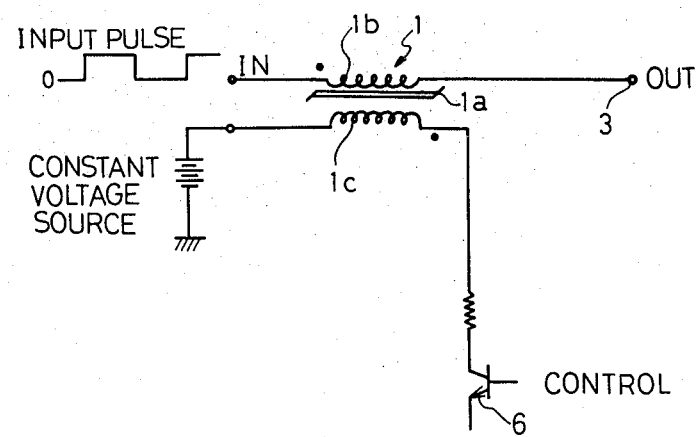
FIG. 8 is a circuit diagram of a modification of the pulse duty control circuit shown in FIG. 2b.

FIG. 8 shows a modification of the pulse duty control system of the present invention. In this instance, a unipolar pulse (changing between a positive and the ground level) is applied to one end of the first coil 1b while the second coil is connected to a constant voltage source, with the energization level being controlled by the transistor 6. The level of current passing through the second coil is chosen to lie in a range substantially below the pulse current level which passes through the first coil so that a reduction of the flux produced by the first coil is achieved for both a positive level and a ground level interval of the input pulse. This manner of controlling the pulse duty ratio by controlling the level of current which normally passes through the second coil is also applicable to the circuit shown in FIG. 1. By way of example, the terminal of the second coil of the duty controlling elements 1, 2 shown in FIG. 1 which is connected to the pulse generator PGE may be disconnected therefrom and connected to a constant voltage source.

Obviously, numerous additional modifications and variations of the present invention are possible in light of the above teachings. It is therefore to be understood that within the scope of the appended claims, the invention may be practiced otherwise than as specifically described herein.

What is claimed as new and desire to be secured by Letters Patent of the United States is:

1. A motor speed control system for driving a control winding of a motor, comprising:
    a motor including a control winding;
    control means for generating a control voltage in correspondence with a desired speed of said motor;
    a pulse duty controlling element including a core made of an amorphous magnetically soft material, a first electrical coil and a second electrical coil wound on said core, said first electrical coil including a first terminal coupled to said control winding to energize said control winding;
    pulse generator means for applying a pulse signal to a second terminal of said first electrical coil to saturate said core magnetically;
    reset means for applying a reset signal to a first terminal of said second electrical coil;
    current controlling means coupled to a second terminal of said second electrical coil and to said control voltage for generating a reset current passing through said second electrical coil in accordance with said control voltage; and
    wherein said reset current resets the level of magnetic flux in said core to a level in dependence on said control voltage, whereby the time until saturation of said core after application of said pulse signal to said first coil is controlled to produce at said first terminal a pulse width controlled control winding energization signal for directly energizing said control winding in relation to said control signal.

2. A motor speed control system as recited in claim 1, wherein said core comprises:
    a ring-shaped laminated core, said laminated core including a spiral winding of a thin sheet of said amorphous magnetically soft material.

3. A motor speed control system as recited in claim 1, wherein said reset means comprises:
    a pulse generator.

4. A motor speed control system as recited in claim 1, wherein said reset means comprises:
    a constant voltage source.

5. A motor speed control system as recited in claim 1, wherein said control means comprises:
    a voltage source having first and second terminals;
    a fixed resistor coupled between said first terminal of said voltage source and an input of said current controlling means; and
    a thermistor coupled between said second terminal of said voltage source and said input of said current controlling means.

6. A motor speed control system as recited in claim 1, wherein said control means comprises:
    a voltage source having first and second terminals;
    a fixed resistor coupled between said first terminal of said voltage source and an input of said current controlling means; and
    a variable resistor coupled between said second terminal of said voltage source and said input of said current controlling means.

7. A motor speed control for driving a control winding of a motor, comprising:
    a motor including a control winding;
    control means for generating a control voltage in correspondance with a desired motor speed;
    pulse generator means for producing a first and a second set of pulses, said first and second set of pulses being phase displaced by 180° from each other;
    a first pulse duty controlling element including a first core made of an amorphous magnetically soft material having a first electrical coil and a second electrical coil wound thereon, said first coil having a first terminal coupled to receive said first set of pulses and a second terminal coupled to a first terminal of a first diode, said first diode having a second terminal coupled to said control winding to energize said control winding, said second coil having a first terminal coupled to receive said second set of pulses, and a second terminal;
    a second pulse duty controlling element including a second core made of an amorphous magnetically soft material having a third electrical coil and a fourth electrical coil wound thereon, said third coil having a first terminal coupled to receive said second set of pulses and a second terminal coupled to a first terminal of a second diode, said second diode having a second terminal coupled to said control winding to energize said control winding, said fourth coil having a first terminal coupled to receive said first set of pulses and a second terminal;
    said first and second sets of pulse signals saturating said first and second cores magnetically, respectively;
    current controlling means coupled to the second terminals of said second and said fourth coils for generating respective reset currents in said second and fourth coils upon respective application of said second and first sets of pulses thereto, said current controlling means also coupled to said control voltage and including means for varying the levels of said reset currents in relation to said control voltage;

wherein said reset currents reset the respective levels of magnetic flux in said first and second cores to magnetic flux levels in dependence on said control voltage, whereby the time until saturation of said cores after application of the respective sets of pulse signals thereto is controlled to produce at said second terminals of said first and second diodes a pulse width controlled control winding energization signal for directly energizing said control winding in relation to said control signal.

8. A motor speed control system as recited in claim 7, wherein said first and second cores each comprise:

a ring-shaped laminated core, said laminated core including a spiral winding of a thin sheet of said amorphous magnetically soft material.

* * * * *